United States Patent

Lang et al.

Patent Number: 6,068,077
Date of Patent: May 30, 2000

[54] POWER STEERING GEAR INTENDED IN PARTICULAR FOR MOTOR VEHICLES

[75] Inventors: Armin Lang, Schwäbisch Gmünd; Wolfgang Abele, Alfdorf; Stefan Fröhlich, Mutlangen; Helmut Knödler, Lorch, all of Germany

[73] Assignee: ZF Friedrichshafen AG, Friedrichshafen, Germany

[21] Appl. No.: 09/091,181

[22] PCT Filed: Dec. 5, 1996

[86] PCT No.: PCT/EP96/05434

§ 371 Date: Jun. 10, 1998

§ 102(e) Date: Jun. 10, 1998

[87] PCT Pub. No.: WO97/21580

PCT Pub. Date: Jun. 19, 1997

[30] Foreign Application Priority Data

Dec. 12, 1995 [DE] Germany .......................... 195 46 291

[51] Int. Cl.[7] ............................................. B62D 5/087
[52] U.S. Cl. ................................. 180/441; 91/372
[58] Field of Search ............................ 180/417, 421, 180/422, 423, 441; 91/434, 375 R, 372, 371

[56] References Cited

U.S. PATENT DOCUMENTS

| | | | |
|---|---|---|---|
| 3,922,953 | 12/1975 | Strauff | 91/371 |
| 3,967,537 | 7/1976 | Strauff | 91/372 |
| 4,555,975 | 12/1985 | Lang et al. | 91/417 R |
| 5,529,137 | 6/1996 | Lang | 180/417 |

*Primary Examiner*—Kevin Hurley
*Attorney, Agent, or Firm*—Larson & Taylor

[57] ABSTRACT

A power steering system, in particular for motor vehicles, includes a steering valve (15), for controlling a pressure medium for a servomotor, has two inlet seat valves (23, 24) and two outlet seat valves (25, 26), each with one closing body (31; 36). The closing bodies (36) of the outlet seat valves (25, 26) are actuatable via an actuating device as a function of a rotary motion of a steering-wheel shaft connected to an input member (10) of the steering system. The closing bodies (31) of the inlet seat valves (23, 24) are hydraulically pressure balanced with reference to a pressure of a pressure source, and by the force of locking springs (32) they keep the inlet seat valves (23, 24) closed in the neutral position of the steering valve. Each locking spring (32) is supported at one end on a closing body (31) of one of the inlet seat valves (23, 24) and on the other on the actuating device. The outlet seat valves (25, 26) are opened in the neutral position of the steering valve (15). The effective cross section of the closing bodies (36) of the outlet seat valves (25, 26) is smaller than the effective cross section of the closing bodies (31) of the inlet seat valves (23, 24). The steering valve (15) is disposed between the input member (10) and an output member (8) of the steering system. The actuating device has at least one actuating level (27) for actuating the outlet seat valves (25, 26).

29 Claims, 7 Drawing Sheets

POWER STEERING GEAR INTENDED IN PARTICULAR FOR MOTOR VEHICLES

BACKGROUND OF THE INVENTION

1. Field of the Invention

The invention relates to a power steering system, in particular for motor vehicles. The power steering system includes a steering valve, for controlling pressure medium for a servomotor, has two inlet seat valves and two outlet seat valves, each with one closing body. The closing bodies of the outlet seat valves are actuatable by an actuating device as a function of the rotary motion of a steering-wheel shaft connected to an input member of the steering system. The closing bodies of the inlet seat valves are hydraulically pressure balanced with reference to a pressure of a pressure source, and by the force of locking springs they keep the inlet seat valves closed in the neutral position of the steering valve. Each locking spring is supported at one end on a closing body of one of the inlet seat valves and on the other by the actuating device. The outlet seat valves are open in the neutral position of the steering valve. The effective cross section of the closing bodies of the outlet seat valves is smaller than the effective cross section of the closing bodies of the inlet seat valves.

2. Brief Description of the Prior Art

One such power steering system is known from German Patent Disclosure DE 43 03 854. In an exemplary embodiment of this known power steering system, a rack-type power steering system is described. The actuation of the steering valve is done by a pivoting motion of the pinion. The inlet seat valves and the outlet seat valves are disposed such that their axes are substantially at right angles to the axis of the pinion. The valves are disposed in a lower region of the pinion, below the rack. In motor vehicles, there is often only a very constricted space available in this region of the power steering system.

SUMMARY OF THE INVENTION

The object of the invention is to create a power steering system in which the steering valve is very compact and can therefore be accommodated in a space-saving way.

This object is attained by the power steering system described herein. Specifically, in a power steering system of the generic type in question, the steering valve is disposed between the input member and an output member of the steering system. The actuating device has at least one actuating lever for actuating the outlet seat valves. As a result of this embodiment, the steering valve can be accommodated in the upper portion of the power steering system. This is made possible by the fact that because of the actuation via the actuating lever, the control paths of the seat valves can be longer than when actuation is by a pivoting pinion. Because of the longer stroke of the valves, the requisite cross-sectional flows can be achieved with smaller valve diameters.

Expedient and advantageous features of the invention are described herein. However, the invention is not limited to the combination of characteristics described herein. For one skilled in the art, further logical possibilities of combining features and individual characteristics will be apparent from the stated object.

The actuating lever is expediently solidly connected to the input member of the steering system. Depending on structural conditions, it is possible to provide either a separate actuating lever for each of the outlet seat valves or one common actuating lever, in particular with two arms, for both of the outlet seat valves.

The closing body of the outlet seat valve cooperates either directly or indirectly with the actuating lever that is engaged by the locking spring. An actuating pin can be kept in operative connection with the actuating lever by means of an actuating spring. The closing body of the outlet seat valve can be embodied either separately from or integrally with the actuating pin.

To enable a general introduction of force upon a rotation of the input member, a lead spring may be disposed between the input member and the actuating device. The lead spring may be disposed between the input member and the actuating lever. Another, structurally simple possible way of disposing the lead spring is obtained if the input member is solidly joined to the actuating lever. In that case, one lead spring each is disposed between the actuating lever and each closing body of the outlet seat valves. An especially advantageous construction is obtained if each lead spring is embodied directly as the closing body of an outlet seat valve. The lead spring may be a flat annular spring, through whose central opening the actuating pin is passed. Expediently, the spring travel of the lead spring is limited by a stop disk. If the stop disk is supported in rocking fashion on the actuating pin, then the stop disk is free of tilting moments and can easily adjust the precise position of the lead spring.

To vary the valve characteristic curve of the steering valve, one limiting piston acted upon by a spring may be assigned to each inlet seat valve. To simplify dimensioning this spring, it is retained with prestressing on the limiting piston between two stops. One stop can then be formed as a collar of the limiting piston and the other by a snap ring secured to the limiting piston.

If a torsion bar is disposed between the inlet member and the output member of the steering system, then some of the torque introduced at the input number can be transmitted directly to the output member without generating shear forces. This avoids the necessity of having to carry the entire torque via the valves. Moreover, this increases the actuating moment in the operative region of the lead spring.

The invention will be described below in further detail in terms of several exemplary embodiments shown in the drawings.

DETAILED DESCRIPTION OF THE PREFERRED EMBODIMENTS

Figure 1:
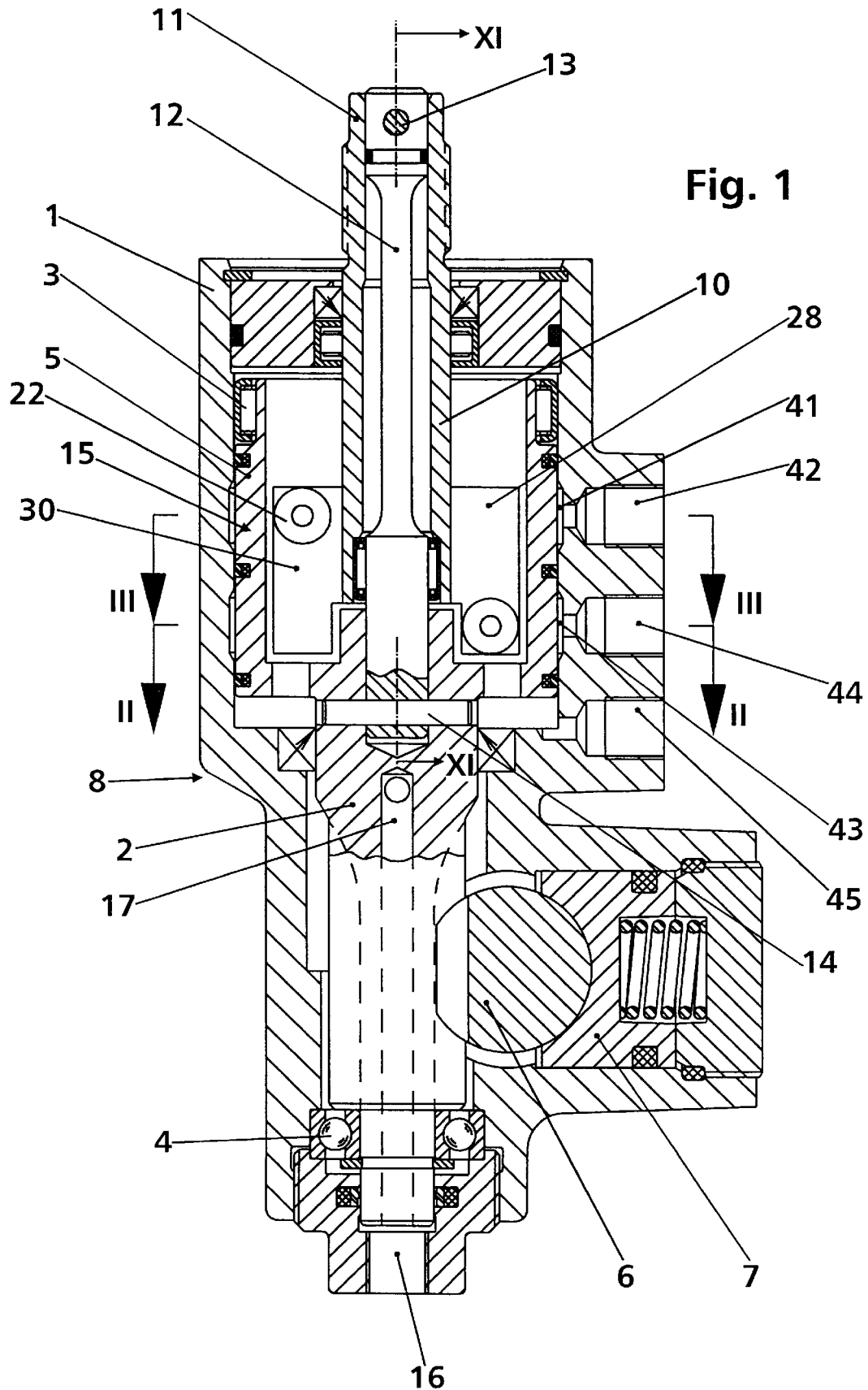
FIG. 1, a longitudinal section through the power steering system according to the invention, taking a rack-type power steering system as an example.
Figure 2:
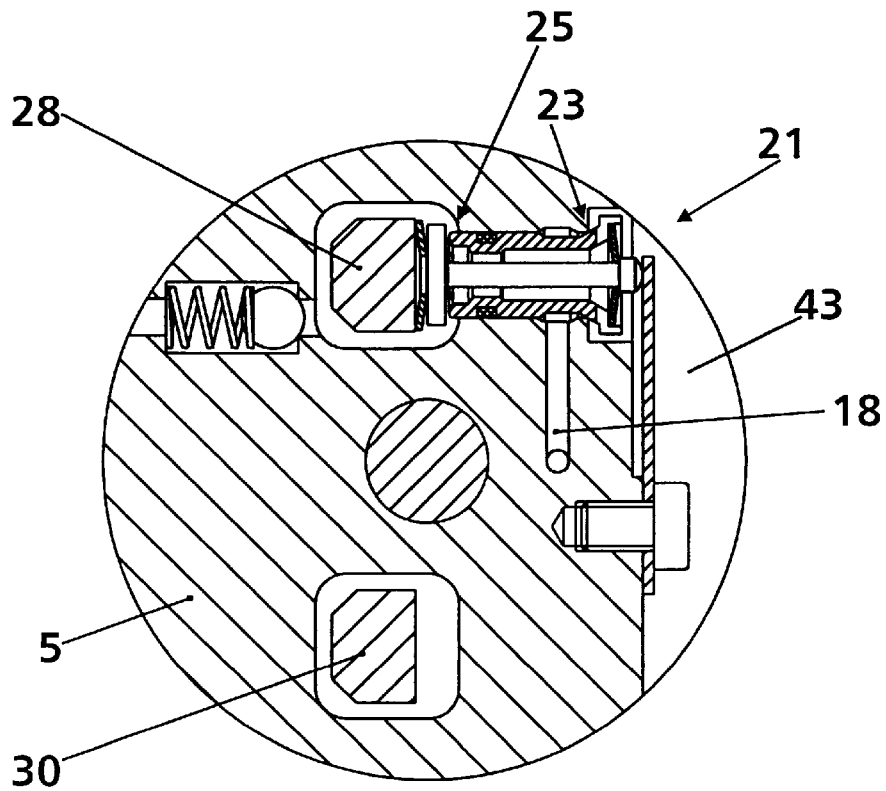
FIG. 2, a cross section through the power steering system taken along the line II—II of FIG. 1.

For the sake of simplicity, the invention will be described in terms of a rack-type power steering system. However, the invention can also be used for other power steering systems, such as ball and nut power steering systems.

In a steering housing 1, a pinion 2 is rotatably supported in two bearings 3 and 4. One bearing 3 is disposed on a valve body 5, which is embodied integrally with the pinion 2 or is solidly joined to pinion 2. The pinion 2, via its teeth, meshes with a rack 6, which is guided axially displaceably in the steering housing 1. The rack 6 is pressed against the teeth of the pinion 2 in a known manner with the aid of a spring-loaded pressure piece 7.

The pinion 2 together with the valve body 5 forms an output member 8 of the power steering system. An input member 10 of the power steering system, on one end, has a steering-wheel shaft connection 11 for connection to a steering device, for instance a shaft, not shown, of a steering wheel.

A torsion bar 12 is disposed between the input member 10 and the output member 8, being solidly joined to the input member 10 for instance by a pin 13 and to the output member 8 or the pinion 2 by a pin 14.

A steering valve 15 is located between the input member 10 and the output member 8. The steering valve 15 is supplied with pressure medium, which is pumped by a servo pump, not shown, and expediently stored in a tank, through an inflow connection 16 via a central conduit 17 and branch conduits 18 and 20.

The steering valve 15 is embodied in two parts 21 and 22. Each part 21 and 22 of the steering valve 15 contains one inlet seat valve 23 and 24, respectively, and one outlet seat valve 25 and 26, respectively. One inlet seat valve 23 or 24 and one outlet seat valve 25 or 26, respectively, are disposed coaxially with one another. Both parts 21 and 22 of the steering valve 15 are operatively connected to an actuating lever 27, which in the exemplary embodiment is solidly joined to the input member 10 and is used for the common actuation of both parts 21 and 22 of the steering valve 15. To that end, the actuating lever 27 has two arms 28 and 30, each of which serves to actuate one of the two parts 21 and 22, respectively, of the steering valve 15. Instead of one common actuating lever 27 for both parts 21 and 22 of the steering valve 15, each part 21 and 22 may also be actuated by a separate actuating lever.

Figure 3:
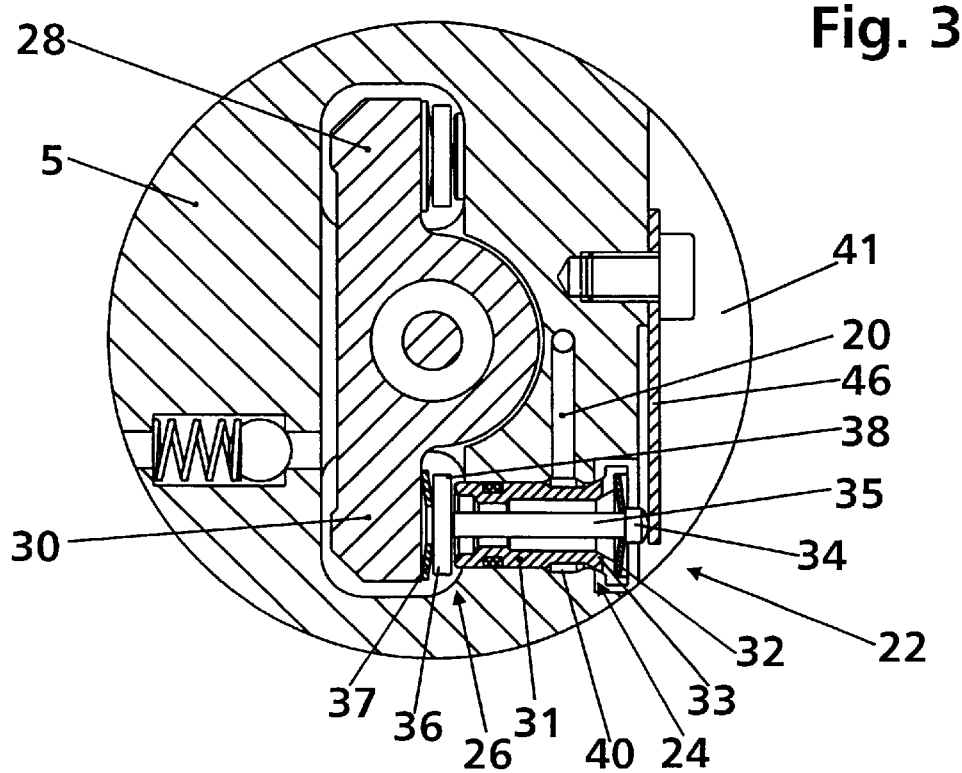
FIG. 3, a cross section through the power steering system taken along the line III—III of FIG. 1.

The two parts 21 and 22 of the steering valve 15 are embodied substantially identically. The more specific construction of the steering valve 15 will therefore be described below only in conjunction with the one part, that is, part 22 shown in FIG. 3.

In the neutral position of the steering valve 15, the inlet seat valve 24 is closed. This is attained in that its closing body is pressed by the force of a locking spring 32, in the form of a cup spring, in the closing direction against a valve seat 33 that is formed on the valve body 15. The locking spring 32 is supported at one end on the closing body 31 and at the other on a head 34 of an actuating pin 35. The actuating pin 35 passes through a bore in the closing body 31 and is operatively connected to the arm 30 of the actuating lever 27 via a closing body 36 of the outlet seat valve 26 and via a lead spring 37. The closing body 36 of the outlet seat valve 26 cooperates with a valve seat 38 disposed on the closing body 31 of the inlet seat valve 24.

The branch conduit 20, which communicates with the inflow connection 16, is connected to an inflow chamber 40 that is disposed on the inlet seat valve 24. A chamber 41, which in the neutral position of the steering valve 15 is separated from the inflow chamber 40 and communicates with a cylinder connection 42. A chamber 43 for the inlet seat valve 23 communicates in the same way with a second cylinder connection 44. In addition, the two chambers 41 and 43 communicate with a return connection 45 via the respective bores of the closing bodies of the inlet seat valves 23 and 24. The two chambers 41 and 43 are formed between the steering housing 1 and the valve body 5. The cylinder connections 42 and 44 communicate with two work chambers of a servo motor, not shown.

The actuating pin 35 is kept in operative connection with the closing body 36 of the outlet seat valve 26, and thus indirectly with the actuating lever 27, via an actuating spring 46, which is embodied as a flat spiral spring. The actuating pin 35 is dimensioned in terms of length such that the locking spring 32 is force-free whenever the closing body 36 of the outlet seat valve 26 rests flat on the valve seat 38, or in other words when the outlet seat valve 26 closes. If the outlet seat valve 26 is opened, then the locking spring 32 is pressed by the actuating spring 46 against the closing body 31 of the inlet seat valve 24, so that the inlet seat valve 24 is securely closed.

The actuating spring 46 may take other forms, instead of being embodied as a flat spiral spring. For instance, a curved hoop spring, which from a state of contact with the head 34 of the actuating pin 35 bends in an arc over the valve body 5, offers the advantage of an increased contact pressure force of the closing body 31 of the inlet seat valve 24 against the valve seat 33 with less spring stiffness.

The effective cross section of the closing body 36 of the outlet seat valve 26 is smaller than the effective cross section of the closing body 31 of the inlet seat valve 24.

The function of this exemplary embodiment of the power steering system of the invention will now be described: In the neutral position, shown, the two cylinder connections 42 and 44 communicate through the bores in the closing bodies of the inlet seat valves 23 and 24 and via the open outlet seat valves 25 and 26 with the return connection 45. The open neutral gap between the outlet seat valves 25 and 26 is equal to the prestressing travel of the locking springs 32. To overcome this, a corresponding prestressing travel of the actuating spring 46 is required.

If a torque is initiated at the input member 10 by a rotation of the steering wheel, not shown, for instance to turn the vehicle to the left, then first the input member 10 rotates, and the actuating lever 27 pivots with its arms 28 and 30 until the neutral gap of the outlet seat valve 26 disappears on the left-hand side, and the arm 30 causes the closing body 36 of the outlet seat valve 26, via the lead spring 37, to contact the valve seat 38. In this pivotable connection region, marked "a" in FIG. 11, the two cylinder connections 42 and 44 are both still without pressure.

The hydraulic reinforcement of the steering valve 15 ensues when the closing body 36 of the outlet seat valve 26 rests on the valve seat 38 and presses against it.

As described above, the locking spring 32 is then force-free. The only force now acting on the valve body 31 of the inlet seat valve 24 is the force brought to bear by the closing body 36, which pushes the closing body 31 toward the right. As a result, the inlet seat valve 24 opens. Pressure fluid flows from the branch conduit 20 to the cylinder connection 42, and on the right-hand side of the closing body 31 builds up a pressure corresponding to its cross section and to the force exerted on it by the closing body 36, which force is generated by the torque at the input member 10. Because as a consequence of this force the lead spring 37 is compressed, the torsion bar 12 must be rotated at the same time. This increases the torque to be brought to bear at the input member 10, in accordance with the torsional rigidity of the torsion bar 12 and the elasticity of the lead spring 37. The second branch "b" of the characteristic curve ends once the spring travel of the lead spring 37 has been completed.

Once the lead spring 37 is thereafter out of operation, no further substantial torsion of the torsion bar 12 occurs. The increase in torque at the input member 10 is now determined substantially only by the hydraulic load on the closing body 31 and on the active arm 30 of the actuating lever 27.

Once the pressure in the cylinder connection 42 reaches the pressure at the inflow connection 16, no further increase in pressure is possible, and the input member 10 upon a further increase in torque rotates until the actuating lever 27, with its arm 28, strikes the valve body 5. In this process, the inlet seat valve 24 is opens wide. This makes it possible to rinse out foreign bodies. This status of the pressure limitation is marked "d" in FIG. 11.

The pressure fluid cannot escape from the cylinder connection 43 back to the return connection 45 until the closing body 36 of the outlet seat valve 26 lifts away from the valve seat 38 on the closing body 31 of the inlet seat valve 24. To prevent this from already occurring at the ascending branch "c" of the characteristic curve in FIG. 11, the effective cross section of the closing body 36 of the outlet seat valve 26 is smaller than the effective cross section of the closing body 31 of the inlet seat valve 24. Without these given structural conditions, the pressure fluid could escape directly from the inflow connection 16 to the return connection 45, and the pressure tank, not shown but connected to the inflow connection 16, would be emptied. The fifth branch "e" of the characteristic curve therefore has a steeper course than the third branch "c". Branch "e" of the characteristic curve ends once the torque at the input member 10 has been lowered to such an extent that the lead spring 37 begins to relax.

Once the lead spring 37 relaxes, as the torque continues to decrease, the input member 10 rotates rearward, and the torsion rod moment decreases. Branch "f" of the characteristic curve therefore has a flatter course than branch "e". Once the lead spring 37 has relaxed enough that its spring force is equal to the spring force of the actuating spring 46, the closing body 36 lifts away from the valve seat 38, and the hydraulic load disappears. Because of the above-described design conditions and the action of the locking spring 32 at the same time, the spring force of the locking spring replaces the hydraulic locking force on the closing body 31 of the inlet seat valve 24, and thus keeps the inlet seat valve 24 securely closed. The transition to the first branch "a" of the characteristic curve then ensues.

With clockwise torque, the right-hand part 21 of the steering valve 15 is correspondingly actuated.

To reduce the actuating moments during parking, the actuating moment should be increased only insignificantly further, beyond a certain pressure in the servo motor. This means that from that certain point on, the characteristic curve has a steeper course. This effect is called "cut-off" or "actuation moment limitation."

This "cut-off" is effected by means of a limiting piston 47, which is associated with the inlet seat valve 24 and is acted upon by an actuating spring 48. The limiting piston 47 has a slightly smaller diameter than the closing body 31 of the inlet seat valve 24. The limiting piston 47 is disposed parallel to the inlet seat valve 24 in a plane that is perpendicular to the longitudinal axis of the steering valve 15. As a result, the hydraulic action of the limiting piston 47 acts counter to that of the closing body 31 of the inlet seat valve 24.

Figure 4:
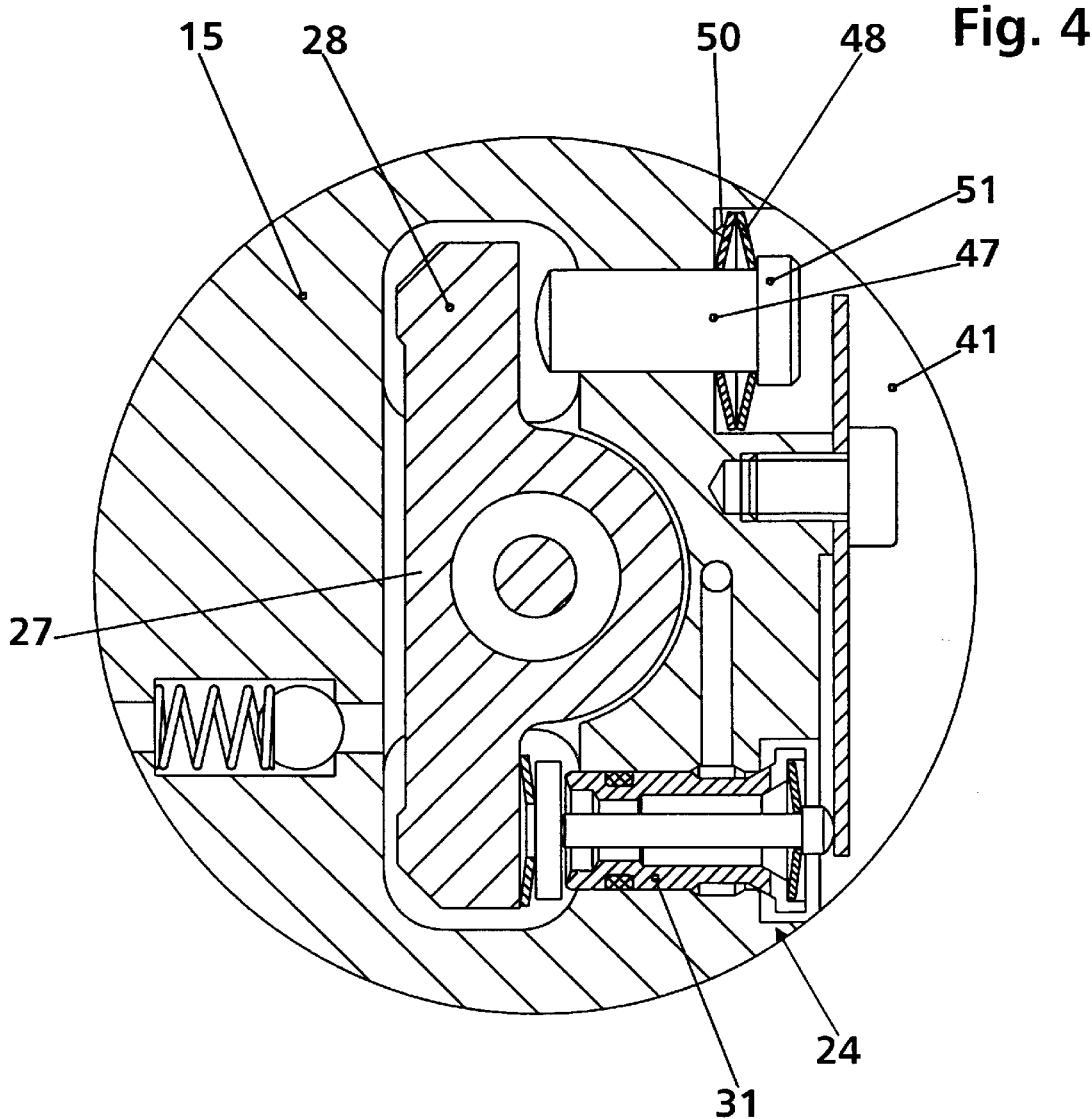
FIG. 4, a cross section through a further exemplary embodiment of the power steering system of FIG. 1.
Figure 12:
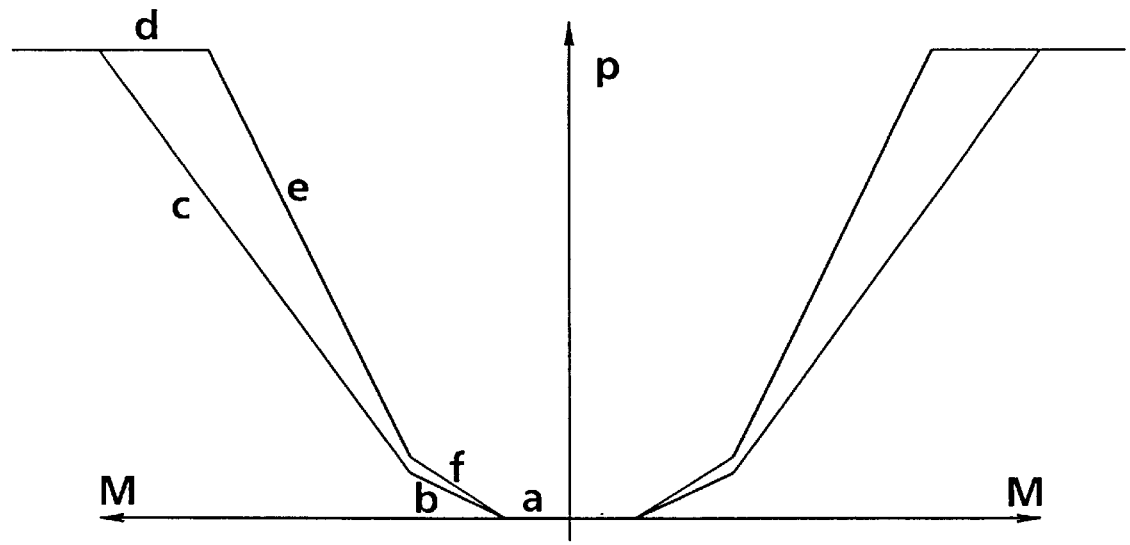
FIGS. 12 and 13, the course of the valve characteristic curve of two exemplary embodiments of the power steering system. In these graphs, the pressure p in the servo motor is plotted over the torque M at the input member of the steering system.
Figure 13:
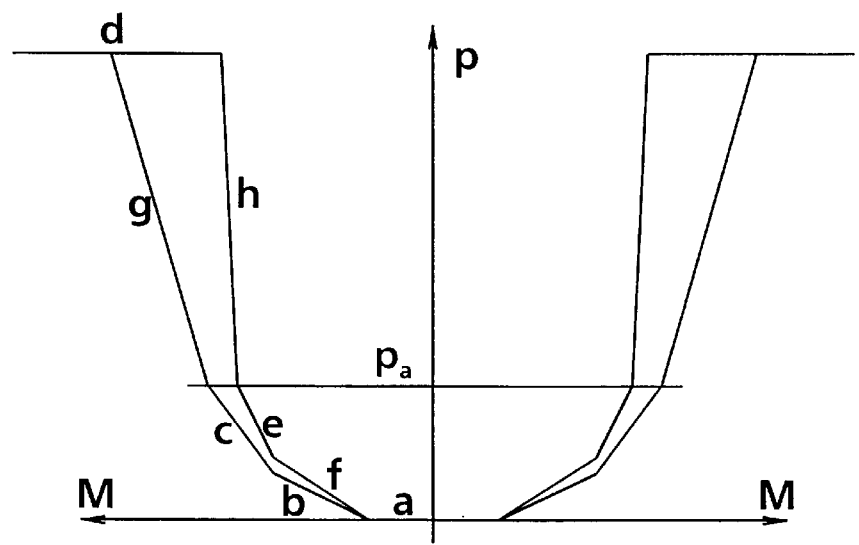

The actuating spring 48 is supported at one end on a stop face 50 of the steering valve 15 and on the other on a collar 51 of the limiting piston 47. With respect to the cross section of the limiting piston 47, the actuating spring 48 should be dimensioned such that the limiting piston 47 does not act upon the arm 28 of the actuating lever 27 until the cut-off pressure Pa of FIG. 12 is reached in the chamber 41. This version is shown in FIG. 4.

Figure 5:
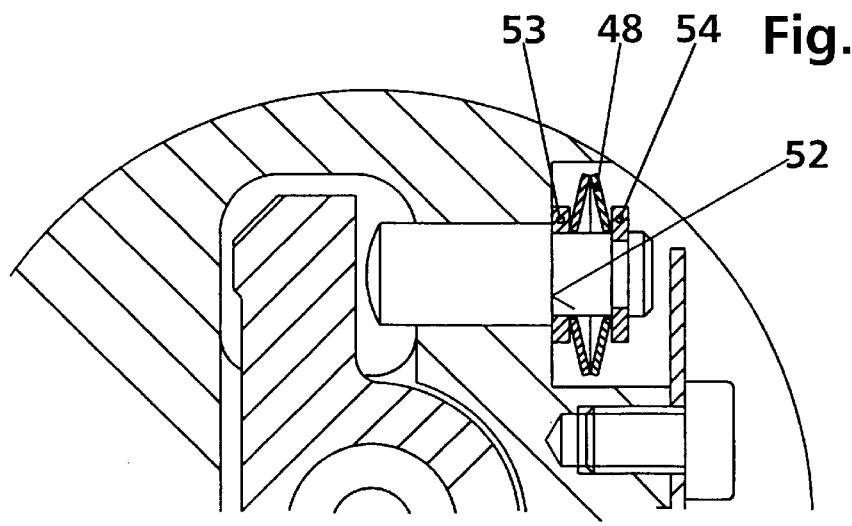
FIG. 5, a detail from the upper portion of FIG. 4, for a further exemplary embodiment.

In an exemplary embodiment that is shown in FIG. 5, the actuating spring 48 is held in prestressed fashion between two stops. One of the stops is formed by a shoulder 52 of the limiting piston 47 and an optionally intervening adjusting shim 53 and the other stop is formed by a snap spring 54 secured to the limiting piston 47. In this version, the actuating spring 48 can easily be adjusted before the steering system is installed.

The course of the characteristic curve in this version having the limiting piston 47, is supplemented in FIG. 12 by the additional branches "g" and "h."

In the exemplary embodiments described thus far, the locking spring 32 was not actuated directly via the actuating lever 27 but rather indirectly, with the interposition of the lead spring 37. This requires a precise calibration of the actuating spring 46. If the stiffness of the valve system is to be increased, then constructions of the kind to be described in conjunction with the following exemplary embodiments are proposed.

Figure 6:
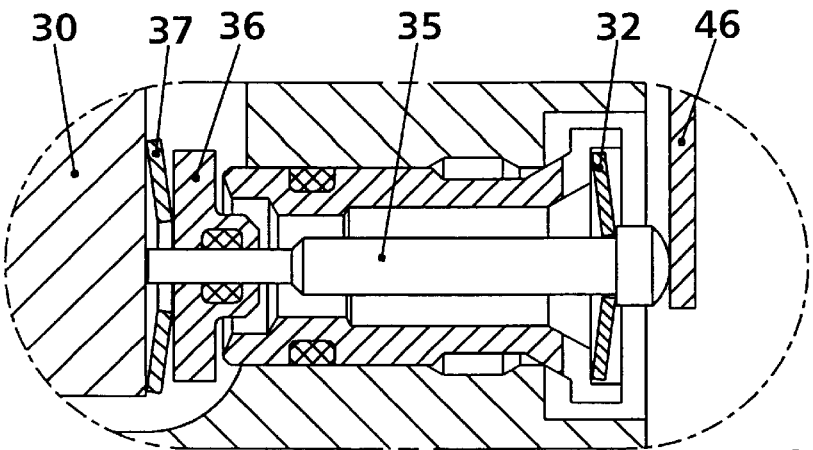
FIGS. 6–10, a detail on a larger scale from the lower portion of FIG. 3 for further exemplary embodiments.

In the exemplary embodiment of FIG. 6, the actuating pin 35 is passed in sealing fashion through the closing body 36 of the outlet seat valve 26. As a result, the actuating spring 46 can be supported via the actuating pin 35 directly on the actuating lever 27, or its arm 30. The actuating spring 46 can equalize its prestressing force via the prestressing force of the other part 21 of the steering valve 15. The actuation of the locking spring 32 is effected correspondingly, bypassing the lead spring 37.

Figure 7:
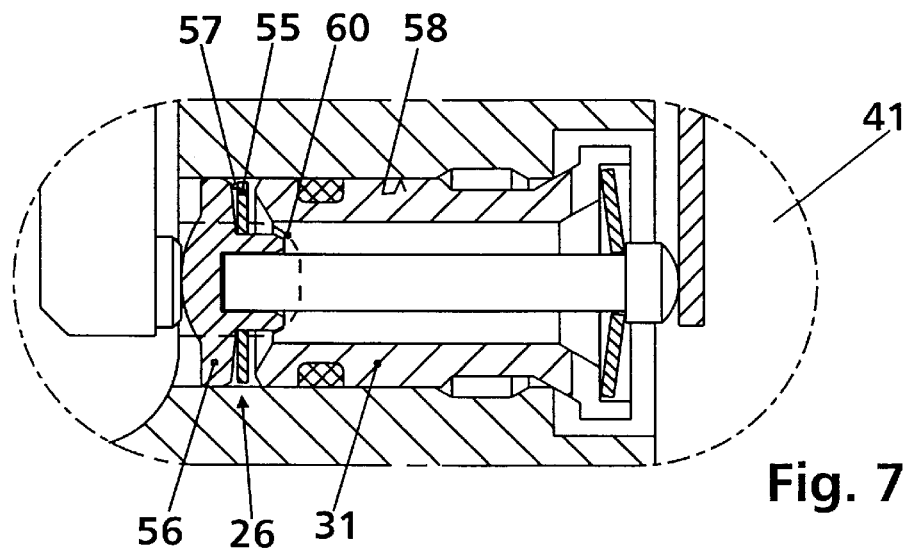

In the exemplary embodiment of FIG. 7, a seal between the actuating pin and the closing body of the outlet seat valve (FIG. 6) can be dispensed with, and the attendant friction can be avoided if a lead spring 55 is used directly as a closing body for the outlet seat valve 26. In order to limit the spring travel of the lead spring 55 in this exemplary embodiment, an additional stop disk 56 is employed. The lead spring 55 may be embodied as a cup spring. Advantageously, however, a flat annular spring is used as the lead spring 55, with its spring travel being adjustable arbitrarily by a suitable shaping, for instance a frustoconical chamfer 57 of the stop disk 56. The stop disk 56 may be guided on its outer diameter directly in a bore 58 of the steering valve 15, in which the closing body 31 of the inlet seat valve 24 is also guided. To assure a communication from the chamber 41 to the return connection 45 while the outlet seat valve 26 is open, suitable slits 60 are provided, either in the bore 58 or in the stop disk 56. A metal-to-metal seal exists between the inner circumferential face of the lead spring 55 and a projection of the stop disk 56.

Figure 8:
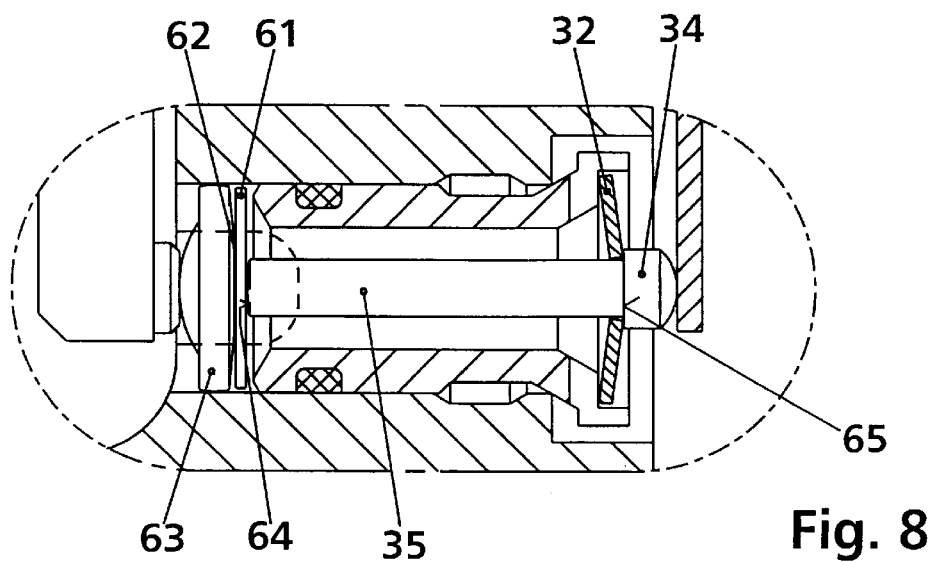

This metal-to-metal seal can be omitted, if instead of the annular lead spring 55 a lead spring 61 in the form of a full-surface spring disk is employed, which rests against a curvature 62 of a stop disk 63, as shown in FIG. 8. In this exemplary embodiment, the actuating pin 35 is not guided on its end toward the actuating lever 27. In order nevertheless to assure a central contact of the actuating pin 35 with the lead spring 61, the dome 64 of the actuating pin 35 must be embodied spherically, with the center of the sphere at the point of intersection of the axis of the closing body 31 with a contact face 65 of the head 34 of the actuating pin 35 on the locking spring 32.

Figure 9:
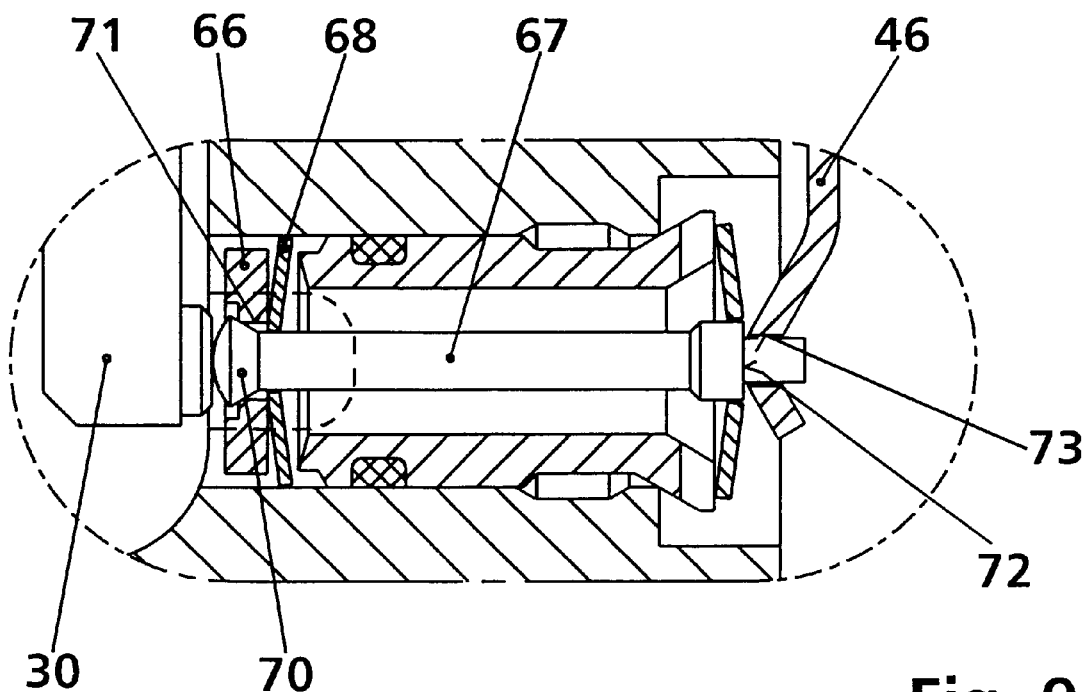

A further variant of the structural embodiment of the stop disk and the actuating pin is shown in FIG. 9. Here a stop disk 66 is supported in rocking fashion on an actuating pin 67. The stop disk 66 is force-free in the pivotable connection region as a result, and can easily adjust to the precise position of the lead spring 68. In this exemplary embodiment, the lead spring 68 is embodied as a cup spring and simultaneously acts as a closing body of the outlet seat valve 26.

On its end toward the actuating lever 27, the actuating pin 67 has a conical or spherical thickened portion 70, which on the one hand sealingly closes a bore 71 in the stop disk 66 and on the other transmits the force from the actuating lever 27 to the stop disk 66 in form-locking, or positively engaged, fashion. To assure the capability of assembly, a stop face 65 of the kind employed in the exemplary embodiment of FIG. 8 is dispensed with here. The stop face 65 is replaced by a stop 72 which acts in the opposite direction and forms a form lock, or positive engagement, with the actuating spring 46. The actuating pin 67 is guided here in a bore 73 of the actuating spring 46.

Figure 10:
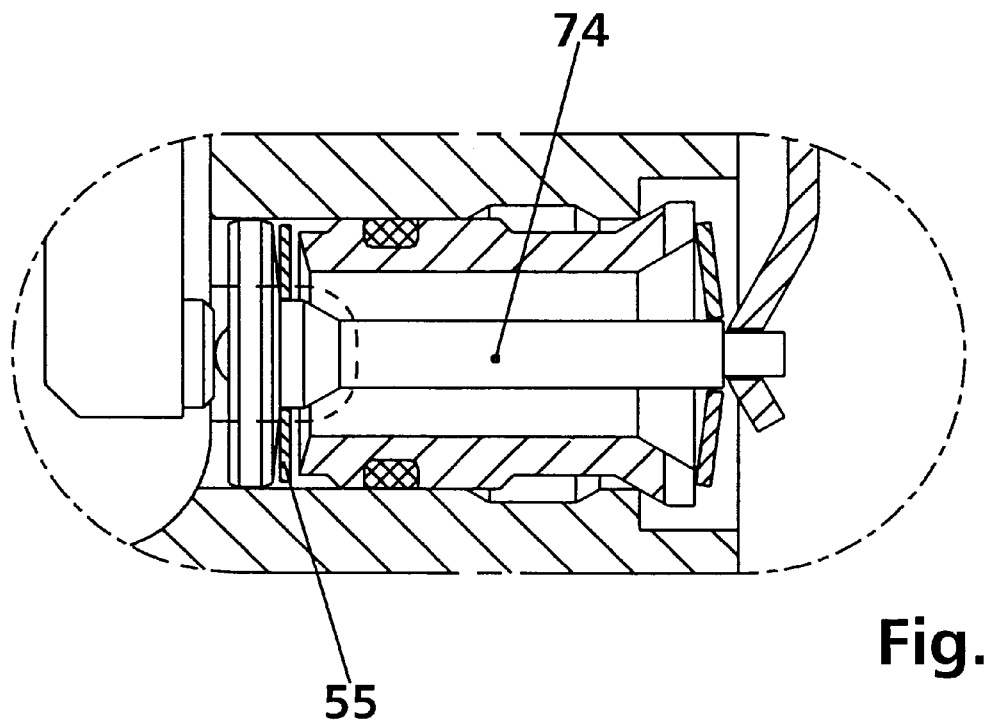

A variant of the embodiment of FIG. 9 is shown in FIG. 10. Here the stop disk 66 and the actuating pin 67 are combined into a one-piece actuating pin 74. As in FIG. 7, the lead spring 55 is embodied as a flat annular spring.

Figure 11:
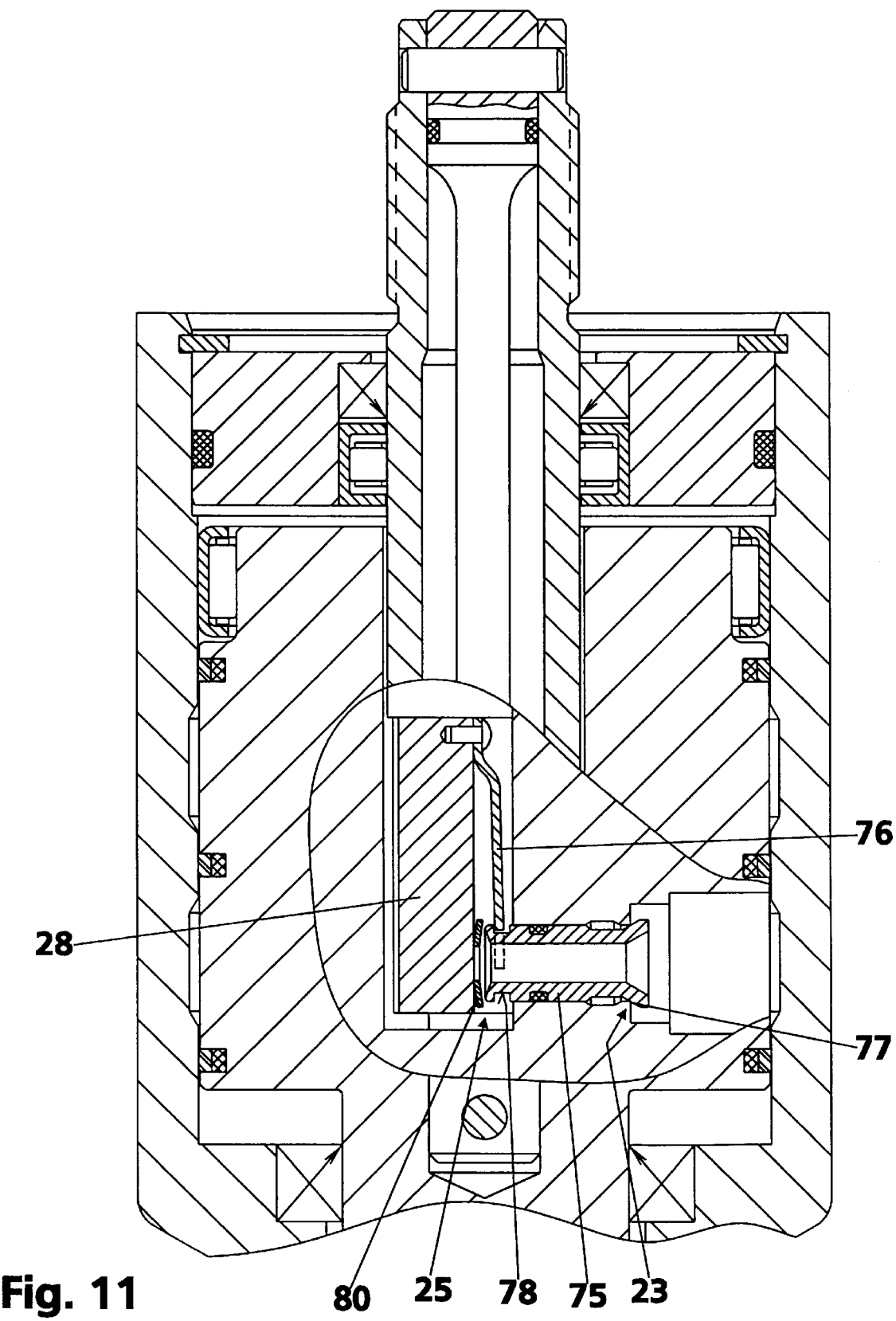
FIG. 11, a longitudinal section through a further exemplary embodiment of the power steering system, on a larger scale, taken along the line XI—XI of FIG. 1.

FIG. 11, is a longitudinal section through a further exemplary embodiment of the power steering system. In this view, a part has been broken out in the region of the part 21 of the steering valve 15 to make the actual valve visible. The inlet seat valve 23 has a closing body 75. The closing body 75 is pressed against its valve seat 77 in the closing direction by a locking spring 76. The locking spring 76 is embodied as a leaf spring, one end of which is secured to the arm 28 of the actuating lever 27. The free end of the locking spring 76 is forked and engages an annular groove 78 of the closing body 75. A lead spring 80 is disposed between the closing body 75 and the arm 28 of the actuating lever 27 and at the same time acts as the closing body of the outlet seat valve 25.

The essential feature in this exemplary embodiment is that an actuating pin and an actuating spring, which are required in the other exemplary embodiments, can be dispensed with. Otherwise, the structure and function of this exemplary embodiment correspond to those of the other exemplary embodiments.

The function of the exemplary embodiments of FIGS. 6–10 is equivalent to that of the exemplary embodiment of FIGS. 1–5 and will therefore not be described in further detail.

What is claimed is:

1. A power steering system, suitable for motor vehicles, having the following characteristics:
    a steering valve, for controlling a pressure medium for a servomotor, is provided with two inlet seat valves and two outlet seat valves, each with one closing body, wherein the closing bodies of the outlet seat valves are actuatable via an actuating device as a function of a rotary motion of a steering-wheel shaft connected to an input member of the steering system;
    the closing bodies of the inlet seat valves are hydraulically pressure balanced with reference to a pressure of a pressure source, and by the force of locking springs they keep the inlet seat valves closed in the neutral position of the steering valve;
    each locking spring is supported at one end on a closing body of one of the inlet seat valves and on the other on the actuating device;
    the outlet seat valves are open in the neutral position of the steering valve;
    one inlet seat valve and one outlet seat valve, respectively, are disposed coaxially relative to one another;
    the effective cross section of the closing bodies of the outlet seat valves is smaller than the effective cross section of the closing bodies of the inlet seat valves,
    the improvement comprising
    the steering valve is disposed between the input member and an output member of the steering system;
    the actuating device has at least one actuating lever for actuating the outlet seat valves; and
    each locking spring is operatively connected to the actuating lever.

2. The power steering system of claim 1, wherein the actuating lever is solidly connected to the input member of the steering system.

3. The power steering system of claim 2, wherein one actuating lever is associated with each outlet seat valve and also with one associated inlet seat valve.

4. The power steering system of claim 2, wherein one common, two-armed actuating lever is provided for both outlet seat valves.

5. The power steering system of claim 1, wherein each closing body of the outlet seat valves cooperates with an actuating pin, which is engaged by the locking spring.

6. The power steering system of claim 5, wherein each actuating pin is operatively connected to the actuating lever.

7. The power steering system of claim 6, wherein each actuating pin is passed sealingly through the respective closing body of the outlet seat valve.

8. The power steering system of claim 6, wherein each closing body of the outlet seat valves is solidly joined to an actuating pin.

9. The power steering system of claim 1 wherein a lead spring is disposed between the input member and the actuating device.

10. The power steering system of claim 9, wherein the spring travel of the lead spring is limited by a stop disk.

11. The power steering system of claim 9, wherein one lead spring is disposed between each actuating lever and each closing body of the outlet seat valves.

12. The power steering system of claim 11, wherein each lead spring forms a closing body of an outlet seat valve.

13. The power steering system of claim 12, wherein the lead spring is embodied as a flat annular spring.

14. The power steering system of claim 12, wherein the lead spring is embodied as a full-surface spring disk.

15. The power steering system of claim 10 wherein the stop disk is supported in rocking fashion on the actuating pin.

16. The power steering system of claim 6 wherein the actuating pin is held in operative connection with the actuating lever by means of an actuating spring.

17. The power steering system of claim 1 wherein one limiting piston acted upon by a limiting spring is assigned to each inlet seat valve.

18. The power steering system of claim 17, wherein the limiting piston has a slightly smaller diameter than the closing body of the inlet seat valve.

19. The power steering system of claim 18, wherein one limiting piston and one inlet seat valve are disposed parallel to one another in a plane that is perpendicular to the longitudinal axis of the steering valve.

20. The power steering system of claim 17, wherein the limiting spring is retained in prestressed fashion on the limiting piston between two stops.

21. The power steering system of claim 20, wherein the stops are formed by a shoulder of the limiting piston and by a snap ring secured to the limiting piston.

22. The power steering system of claim 1 wherein a torsion bar is disposed between the inlet member and the output member of the steering system.

23. The power steering system of claim 17 wherein the limiting spring is retained in prestressed fashion on the limiting piston between two stops.

24. The power steering system of claim 15 wherein the actuating pin is held in operative connection with the actuating lever by means of an actuating spring.

25. The power steering system of claim 10 wherein one limiting piston acted upon by a limiting spring is assigned to each inlet seat valve.

26. The power steering system of claim 16 wherein one limiting piston acted upon by a limiting spring is assigned to each inlet seat valve.

27. The power steering system of claim 10 wherein a torsion bar is disposed between the inlet member and the output member of the steering system.

28. The power steering system of claim 17 wherein a torsion bar is disposed between the inlet member and the output member of the steering system.

29. The power steering system of claim 21 wherein a torsion bar is disposed between the inlet member and the output member of the steering system.

* * * * *